(12) United States Patent
Iida

(10) Patent No.: US 8,089,587 B2
(45) Date of Patent: Jan. 3, 2012

(54) DISPLAY DEVICE

(75) Inventor: Haruhisa Iida, Chiba (JP)

(73) Assignee: Seiko Instruments Inc. (JP)

( * ) Notice: Subject to any disclaimer, the term of this patent is extended or adjusted under 35 U.S.C. 154(b) by 294 days.

(21) Appl. No.: 12/378,180

(22) Filed: Feb. 11, 2009

(65) Prior Publication Data

US 2009/0207350 A1    Aug. 20, 2009

(30) Foreign Application Priority Data

Feb. 14, 2008    (JP) ................................ 2008-033073

(51) Int. Cl.
*G02F 1/1333*     (2006.01)
(52) U.S. Cl. ........... 349/110; 349/158; 349/58; 349/113
(58) Field of Classification Search .................. None
See application file for complete search history.

(56) References Cited

U.S. PATENT DOCUMENTS

| | | | |
|---|---|---|---|
| 6,498,672 B2 * | 12/2002 | Saitoh ........................... 359/245 |
| 7,808,586 B2 * | 10/2010 | Mochizuki ..................... 349/110 |
| 2008/0170179 A1 * | 7/2008 | Shiraishi ......................... 349/65 |

* cited by examiner

*Primary Examiner* — Thanh-Nhan Nguyen
(74) *Attorney, Agent, or Firm* — Adams & Wilks

(57) ABSTRACT

A display device has a display panel having a first substrate for displaying an image that is observed from a front surface of the first substrate. A translucent substrate covers the display panel from the front surface of the first substrate. The translucent substrate has a rear surface and a first light shielding portion on a periphery of the rear surface. A photo-curable translucent adhesive integrally bonds a front surface of the first substrate and the rear surface of the translucent substrate to each other. A first light reflecting portion is formed on the first light shielding portion of the translucent substrate. A second light reflecting portion is formed on a surface of the first substrate so as to oppose the first light reflecting portion through the photo-curable translucent adhesive.

10 Claims, 4 Drawing Sheets

PRIOR ART

FIG. 6A
PRIOR ART
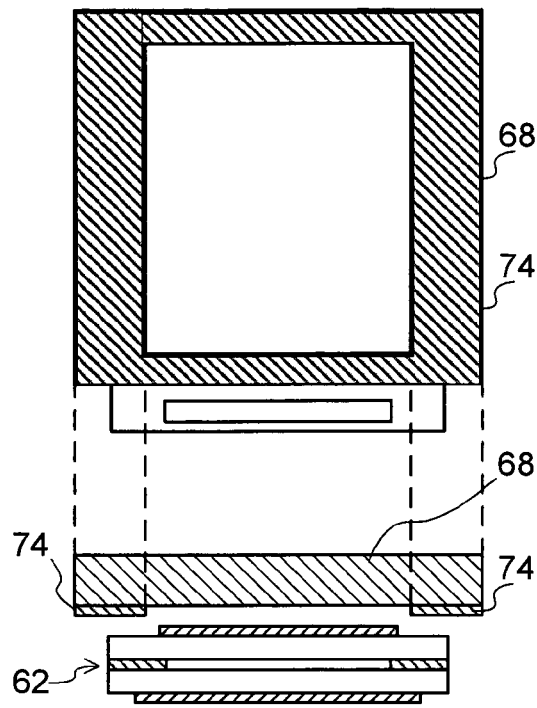
FIG. 6B
PRIOR ART
FIG. 7    PRIOR ART
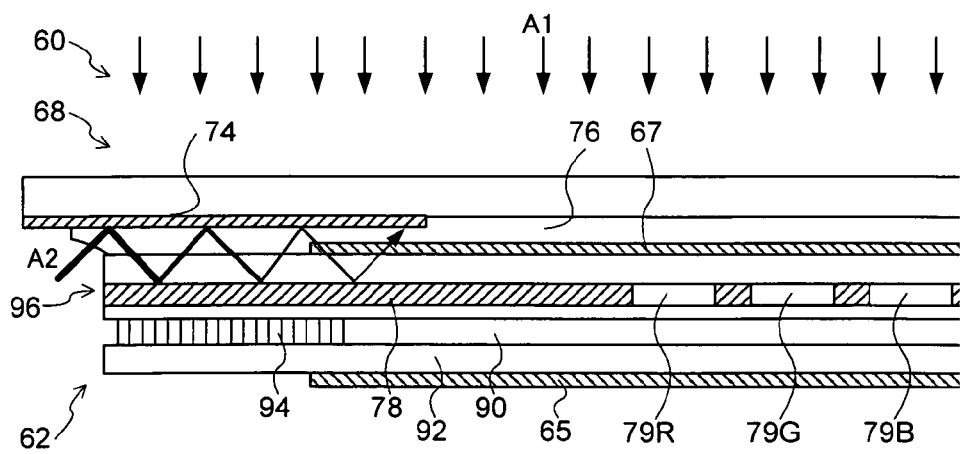

DISPLAY DEVICE

BACKGROUND OF THE INVENTION

1. Field of the Invention

The present invention relates to a display device using a display panel. In particular, the present invention relates to a display device having a structure in which a translucent substrate including a light shielding portion formed on a periphery of a display surface side is bonded to a display panel.

2. Description of the Related Art

A liquid crystal display device (LC display device) is used in various devices such as a cellular phone, a personal digital assistant (PDA), an electronic dictionary, a car navigation system, and a music player. FIGS. 6A and 6B illustrate a conventionally-known liquid crystal display device. FIG. 6A is a plan view and FIG. 6B is a longitudinal sectional view. As illustrated in FIGS. 6A and 6B, the liquid crystal display device includes a liquid crystal display panel (LCD) 62 and a translucent substrate 68 thereabove, which serves as a front plate. In the LCD 62, a liquid crystal layer is sandwiched between two glass substrates, and polarizing plates are bonded to outer surfaces of the two glass substrates. The translucent substrate 68 is entirely transparent, and a black light shielding portion 74 shields light of an outer peripheral portion of the LCD 62 and defines a display region of the LCD 62. The light shielding portion 74 is provided in order that an image beyond the display region may not be viewed by a user and that design aesthetics of a display portion may be improved.

In such a display device as described above, a glass substrate forming the translucent substrate 68 or the LCD 62 is made thinner as the various devices become thinner (for example, thickness of 0.20 mm to 0.25 mm). Further, there are increasing demands for narrowing a gap between the LCD and the translucent substrate (for example, gap equal to or smaller than 0.2 mm).

However, along with the achievement of the thinner liquid crystal display devices, the LCD 62 has become more fragile due to dropping of portable devices onto which the liquid crystal display device is mounted or due to objects fallen onto a display surface of the LCD 62. In addition, there has been a risk that, when an air space is interposed between the LCD 62 and the translucent substrate 68, light may be reflected on the display surface of the LCD 62 or a lower surface of the translucent substrate 68, and hence the display surface becomes dark due to this reflection loss.

For example, JP 09-274536 A discloses the method of filling a gap between the LCD 62 and the translucent substrate 68 with a transparent adhesive. FIG. 7 is a longitudinal sectional view illustrating an end portion of the conventionally-known liquid crystal display device. A liquid crystal display device 60 has the structure in which the gap between the LCD 62 and the translucent substrate 68 which serves as the front plate is filled with a transparent adhesive 76. In the LCD 62, a thin film transistor (TFT) substrate 92 onto which TFTs are mounted and a color filter substrate 96 including color filters 79R, 79G, and 79B formed therein are bonded to each other through a sealing agent 94, and a liquid crystal layer 90 is sandwiched between both the substrates. A transparent electrode is formed on a liquid crystal layer 90 side of the color filter substrate 96. A black matrix 78 is provided in the color filter substrate 96. Polarizing plates 65 and 67 are bonded to outer surfaces of the TFT substrate 92 and the color filter substrate 96, respectively. With this structure, the LCD 62 and the translucent substrate 68 are integrated with each other through the transparent adhesive 76, whereby shock resistance can be increased. Further, with the use of the transparent adhesive 76 having a refractive index which is approximate to that of the translucent substrate 68 or the polarizing plate 65 (67), the reflection loss generated at an interface between the polarizing plate 67 and the transparent adhesive 76 or between the translucent substrate 68 and the transparent adhesive 76 may be reduced.

As the transparent adhesive 76, an optical adhesive of a photo curable type, which is cured by light such as ultraviolet rays or visible light, is mainly used. A heat curing adhesive which is cured by heat may be used, but is difficult to use because, for example, liquid crystals or polarizing plates are deteriorated when the heat curing adhesive is exposed to a high temperature equal to or higher than 100 degrees, or shelf life of the adhesive is short.

On the other hand, a photo-curable adhesive is convenient, for example, it can be bonded under environment of room temperature. A step of curing the photo-curable adhesive as described above includes a first step of filling the gap between the LCD 62 and the translucent substrate 68 with an transparent adhesive 76 and then irradiating the transparent adhesive 76 with light such as ultraviolet rays from a translucent substrate 68 side, and a second step of irradiating the transparent adhesive 76 with light from a lateral side of the LCD 62. Specifically, in the first step, light A1 is emitted from the translucent substrate 68 side to cure the translucent adhesive 76 which is positioned at a translucent portion of the translucent substrate 68. However, the transparent adhesive 76 positioned under the black light shielding portion 74 is shaded, which causes insufficient curing thereof. For this reason, in the second step, light A2 is emitted from the lateral side of the LCD 62. As a result, the transparent adhesive 76 positioned under the light shielding portion 74 is cured.

However, in the liquid crystal display device described above, the gap between the LCD 62 and the translucent substrate 68 is small, and therefore the light A2 is unlikely to penetrate therethrough. In addition, light absorption in the light shielding portion 74 of the translucent substrate 68 is large, and the light A2 is propagated while being repeatedly reflected on the light shielding portion 74 to be attenuated, which involves a risk that the transparent adhesive 76 positioned in the vicinity of the light shielding portion 74 may be insufficiently cured.

Further, the LCD 62 is also provided with the black matrix 78 so as to be opposed to the light shielding portion 74 of the translucent substrate 68. For this reason, light is also absorbed in the black matrix 78, whereby the light A2 is further attenuated. As a result, an uncured portion of the transparent adhesive 76 is left in a lower region of the light shielding portion 74.

When an uncured portion is left in the transparent adhesive 76, sufficient bonding strength cannot be obtained in the vicinity of the LCD 62 and the light shielding portion 74 of the translucent substrate 68, which involves a risk that mechanical strength such as strength against falling may be impaired.

Further, in the transparent adhesive 76, a volume of the adhesive itself contracts during curing. When an uncured portion is left in the transparent adhesive 76, an amount of the volume contraction is small in the vicinity of the light shielding portion 74. Therefore, there is a risk that a thickness of the transparent adhesive 76 may become uneven and the LCD 62 to which the translucent substrate 68 is bonded may be deformed, which is specifically described with reference to FIG. 8. FIG. 8 is an explanatory view of the conventionally-known liquid crystal display device, in which an upper stage is a plan view thereof, a middle stage is a longitudinal sectional view thereof, and a lower stage illustrates a gap between the TFT substrate 92 and the color filter substrate 96. As illustrated in FIG. 8, the light shielding portion 74 for shielding light is provided on a periphery of the translucent substrate 68. The translucent substrate 68 serving as a front plate and the LCD 62 are bonded to each other through the transparent adhesive 76. In the LCD 62, the TFT substrate 92 and the color filter substrate 96 are opposed to each other through the sealing agent 94 or a spacer member 98, and the liquid crystal layer 90 is formed therebetween. When an uncured portion is left in the transparent adhesive 76 positioned under the light shielding portion 74, an amount of the volume contraction becomes small in the vicinity of the light shielding portion 74 and becomes large in the display region. As a result, the TFT substrate 92 and the color filter substrate 96 are deformed to thereby cause fluctuations of a gap (cell gap) between the TFT substrate 92 and the color filter substrate 96. Hence, there is a fear of deterioration of image quality in the display surface, such as display fluctuation. Particularly, a thickness of a substrate forming the LCD 62 is conventionally set to about 0.5 mm, whereas, in recent years, the thickness has been set to 0.2 mm to 0.25 mm by abrasion and thinning through etching or polishing. Accordingly, the LCD 62 is particularly likely to be affected by unevenness of the volume contraction.

In response thereto, the film thickness of the light shielding portion 74 may be reduced to thereby reduce optical density and enhance transmittance from the translucent substrate side, or the light shielding portion may be configured to be a half mirror. However, when a black concentration is reduced, the end portion of the LCD 62 may be viewed from thereabove or light emitted from a backlight may be leaked from therebelow upwardly, which results in poor design aesthetics. Accordingly, the black concentration of the light shielding portion 74 is preferred to be high.

SUMMARY OF THE INVENTION

Under the above-mentioned circumstances, an object of the present invention is, in a case of bonding a translucent substrate and a liquid crystal display panel (LCD) to each other through an optical adhesive, to reduce bonding fluctuations occurring in the vicinity of a light shielding portion provided on a periphery of the translucent substrate, enhance mechanical bonding strength, and prevent deterioration of image quality, which arises from curing variations of the optical adhesive.

In order to achieve the above-mentioned object, a display device according to the present invention includes: a display panel including a display surface for displaying an image; a translucent substrate opposed to the display surface; and a black light shielding portion disposed on a periphery of a display surface side of the translucent substrate, for shielding light, in which the display panel and the translucent substrate are integrally bonded to each other through a photo-curable translucent adhesive. Further, in the display device, a light reflecting portion having high reflectance of light is disposed on the display surface side of the light shielding portion.

Further, in the display device, a second light shielding portion having light shielding property is provided on a periphery of the display panel, and a second light reflecting portion having high reflectance of light is provided on the display surface side of the second light shielding portion.

Further, the second light reflecting portion is provided beyond a viewing range of a user from the display surface side.

According to the present invention, the mechanical bonding strength can be enhanced and the deterioration of image quality, which arises from curing variations of the optical adhesive, can be prevented.

BRIEF DESCRIPTION OF THE DRAWINGS

In the accompanying drawings:

FIG. 6A is a plan view illustrating the conventional liquid crystal display device;

FIG. 6B is a longitudinal sectional view illustrating the conventional liquid crystal display device;

FIG. 7 is a longitudinal sectional view illustrating an end portion of the conventional liquid crystal display device.

DETAILED DESCRIPTION OF THE PREFERRED EMBODIMENT

In the present invention, a display device includes a display panel and a translucent substrate for transmitting light. The display panel has a display surface on which an image is displayed. The translucent substrate is provided so as to be opposed to the display surface. A light shielding portion for intercepting light is provided on a periphery of the translucent substrate. A photo-curable translucent adhesive exists between the display panel and the translucent substrate in order to integrally bond to each other. A light reflecting portion is provided on a display surface side of the light shielding portion. With this structure, the translucent adhesive of the light shielding portion is brought into contact with the light reflecting portion. Accordingly, light for curing the translucent adhesive is prevented from being absorbed in the light shielding portion, and hence an uncured portion of the translucent adhesive can be reduced in the light shielding portion.

Further, a second light shielding portion having light shielding property is provided also on a periphery of the display panel, and a second light reflecting portion is provided on the display surface side of the second light shielding portion so as to be opposed to the light shielding portion of the translucent substrate. With this structure, the translucent adhesive of the light shielding portion is sandwiched between the reflecting portion and the second reflecting portion. Accordingly, the light for curing the translucent adhesive is propagated between the light reflecting portion and the second light reflecting portion, whereby an uncured portion of the translucent adhesive can be reduced in the light shielding portion.

Here, the second light reflecting portion is formed so as to be shaded by the light shielding portion and cannot be seen when the second light reflecting portion is observed from the display surface side.

With reference to FIGS. 1 to 5B, a description is made on the display device according to the present invention. Note that, in this embodiment, a liquid crystal display device 10 is adapted as an example of the display device.

Figure 1:
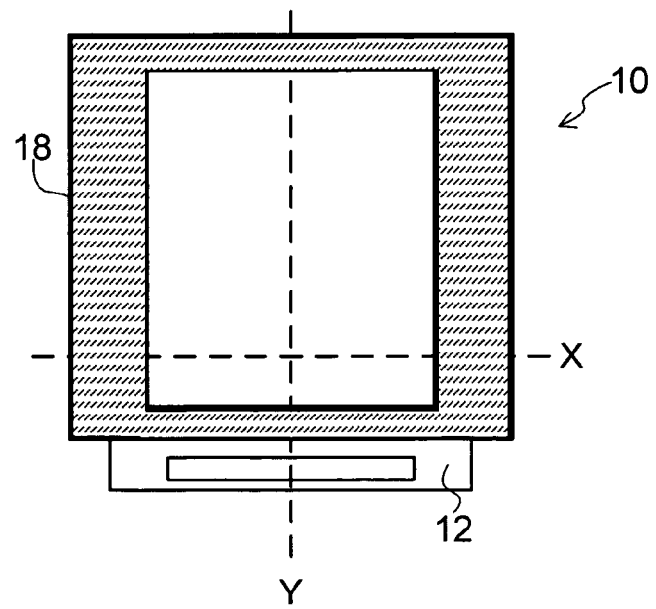
FIG. 1 is a front view illustrating a liquid crystal display device according to a first embodiment of the present invention.

FIG. 1 is a front view illustrating the liquid crystal display device 10 according to a first embodiment of the present invention. As illustrated in FIG. 1, the liquid crystal display device 10 has a configuration in which a cover plate 18 is arranged on an liquid crystal display panel (LCD) 12. The cover plate 18 has a center portion, i.e., translucent region, through which light is transmitted, and a peripheral portion, i.e., light shielding region, in which light is intercepted. From the translucent region, a user views an image displayed by the LCD 12. The user cannot view a portion shaded by the light shielding region.

Figure 2:
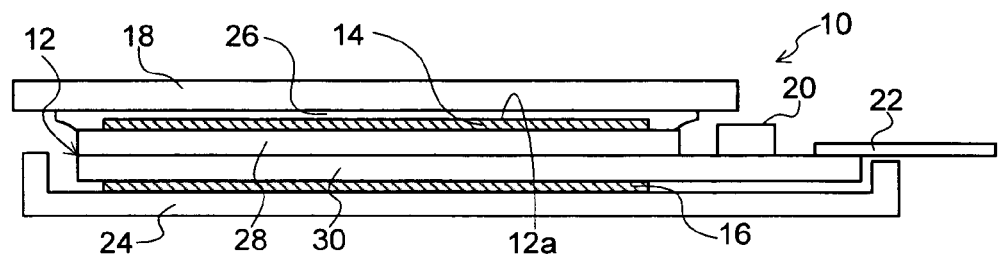
FIG. 2 is a longitudinal sectional view illustrating the liquid crystal display device according to the first embodiment of the present invention.

FIG. 2 illustrates a cross section structure taken along a line Y of FIG. 1. As illustrated in FIG. 2, the liquid crystal display device 10 includes the LCD 12, the cover plate 18, a driver IC 20, a flexible printed circuit board (FPC) 22, and a backlight unit 24.

Figure 3:
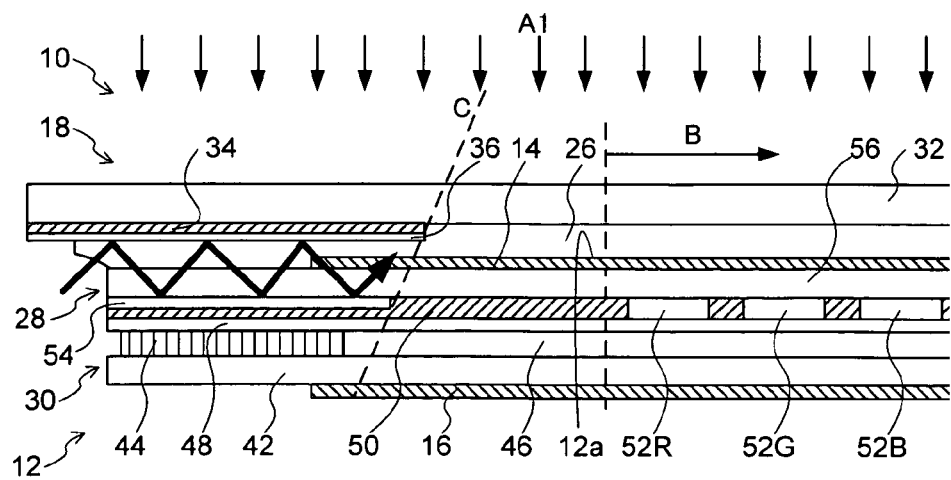
FIG. 3 is a longitudinal sectional view illustrating an end portion of the liquid crystal display device according to the first embodiment of the present invention.

The LCD 12 has a thin plate-like shape. The LCD 12 includes a display surface 12a on which an image is displayed according to a signal from the driver IC 20. The LCD 12 includes a thin film transistor (TFT) substrate 30, a color filter substrate 28, and polarizing plates 14 and 16. The polarizing plate 14, the color filter substrate 28, the TFT substrate 30, and the polarizing plate 16 are configured to be laminated in the stated order. The LCD 12 is bonded to the cover plate 18 on the display surface 12a thereof through an optical adhesive 26. The two polarizing plates 14 and 16 are arranged so as to sandwich the TFT substrate 30 and the color filter substrate 28. Those polarizing plates 14 and 16 transmit light traveling in a specific polarization direction. Further, an upper surface of the polarizing plate 14 becomes the display surface 12a. With reference to FIG. 3, the LCD 12 is described later in more detail.

The cover plate 18 has a thin plate-like shape. The cover plate 18 is a plate for covering the LCD 12 from the display surface 12a side. The cover plate 18 has the center portion, i.e., translucent region, and the peripheral portion (outer periphery), i.e., light shielding region. The cover plate 18 is bonded to the LCD 12 on the display surface 12a side thereof through the optical adhesive 26. With reference to FIG. 3, the cover plate 18 is described later in more detail.

The driver IC 20 controls the LCD 12 and the like. The FPC 22 is a board for supplying a signal to the driver IC 20. The backlight unit 24 emits light from a back surface side of the LCD 12.

FIG. 3 is a longitudinal sectional view illustrating a part of the liquid crystal display device 10 taken along a line X of FIG. 1. As illustrated in FIG. 3, the cover plate 18 includes a translucent plate 32 provided with a light shielding portion 34 and a reflecting portion 36. The translucent plate 32 has a thin plate-like shape. Owing to its light transmission property, the translucent plate 32 makes an image of the LCD 12 viewable and downwardly transmits light from thereabove, such as ultraviolet rays.

The light shielding portion 34 is provided on the display surface 12a side of the translucent plate 32. Further, the light shielding portion 34 surrounds an outer periphery of the translucent plate 32 and prevents an outside of a display region B of an image from being viewed. In this embodiment, as the light shielding portion 34, black ink that intercepts light is formed by printing (black painting), but the light shielding portion 34 is not limited thereto. The light shielding portion 34 may be, for example, a black resin having light shielding property or metal formed by sputtering.

The reflecting portion 36 is provided on the display surface 12a side of the light shielding portion 34. The reflecting portion 36 has a high reflectance of light. In this embodiment, as the reflecting portion 36, a pigment having high light reflection property is used, but the reflecting portion 36 is not limited thereto. The reflecting portion 36 may be, for example, a white pigment. Further, in a case where the light shielding portion 34 is the metal described above, a metal material such as aluminum or chrome is subjected to sputtering and patterning to thereby obtain an arbitrary shape. Further, the reflecting portion 36 is provided on the display surface 12a side of the light shielding portion 34 and thus is not viewed.

Figure 4A:
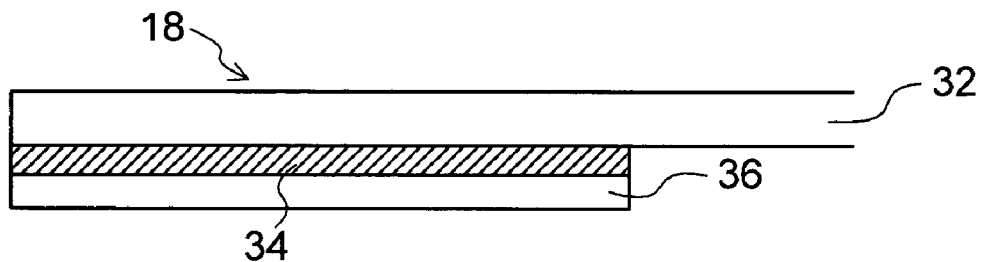
FIG. 4A is a sectional view illustrating the liquid crystal display device according to the first embodiment of the present invention.
Figure 4B:
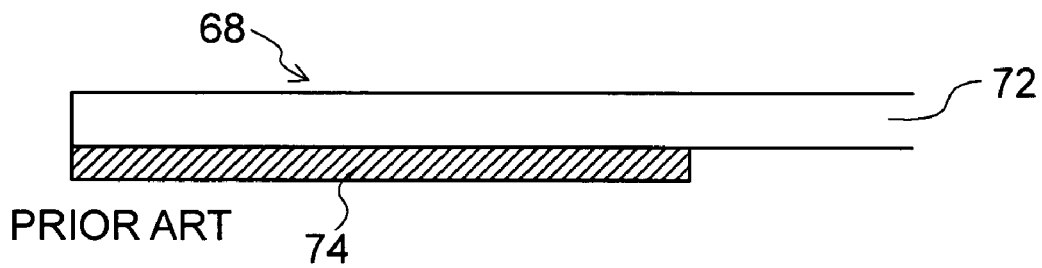
FIG. 4B is a sectional view illustrating a conventional liquid crystal display device.

FIG. 4A is a longitudinal sectional view illustrating an end portion of the cover plate 18 of the liquid crystal display device 10 according to the first embodiment of the present invention, and FIG. 4B is a longitudinal sectional view illustrating an end portion of a cover plate 68 of a conventional liquid crystal display device. Conventionally, the cover plate 68 has a structure in which only a black light shielding portion 74 is provided on a display surface side of a translucent plate 72. In this embodiment, the cover plate 18 has a structure in which the light shielding portion 34 and the reflecting portion 36 are laminated in the stated order on the display surface side of the translucent plate 32. For that reason, as illustrated in FIG. 3, light A2 emitted from a lateral side of the LCD 12 is propagated while being repeatedly reflected not on the light shielding portion 34 but on the reflecting portion 36. Accordingly, attenuation of the light A2 can be suppressed and the optical adhesive 26 is sufficiently cured in the vicinity of the light shielding portion 34.

The color filter substrate 28 has a structure in which a black matrix 50 and color filters 52R, 52G, and 52B respectively having three colors of red, green, and blue are manufactured on a color filter side glass 56.

The black matrix 50 is a second light shielding portion for shielding light. The black matrix 50 is also provided among the respective color filters 52R, 52G, and 52B and in an outside of the display region B, and shields unnecessary light. In this embodiment, as the black matrix 50, a chromium oxide or the like is used, but the black matrix 50 is not limited thereto. The black matrix 50 may be made of, for example, a resin.

Further, a second reflecting portion 54 is provided to an end portion of the color filter side glass 56. The second reflecting portion 54 is arranged outside of the display region B on a cover plate 18 side of the black matrix 50. The second reflecting portion 54 is provided so as to be opposed to the light shielding portion 34 of the cover plate 18 through the optical adhesive 26. The second reflecting portion 54 is provided outside of a user's viewing range C and cannot be viewed. Further, the second reflecting portion 54 has a high reflectance of light. In FIG. 3, the second reflecting portion 54 is provided between the color filter side glass 56 and the black matrix 50. In this embodiment, as the second reflecting portion 54, a metal material such as chrome is used, but the second reflecting portion 54 is not limited thereto. Another metal material such as aluminum may be used. Further, a pigment having high light reflection property or a white pigment may be used.

As illustrated in FIG. 3, an over coat 48 is formed on surfaces of the black matrix 50 and the color filters 52R, 52G, and 52B. The color filter substrate 28 thus formed and the TFT substrate 30 are opposed to each other and bonded through a sealing agent 44, to thereby provide a liquid crystal layer 46 between those two substrates.

Figure 5A:
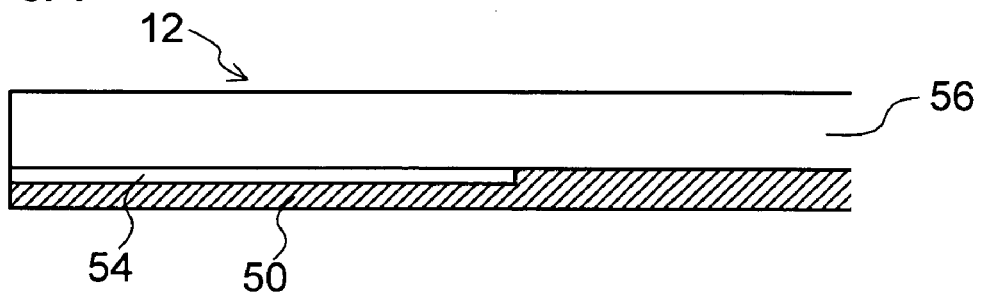
FIG. 5A is a sectional view illustrating the liquid crystal display device according to the first embodiment of the present invention.
Figure 5B:
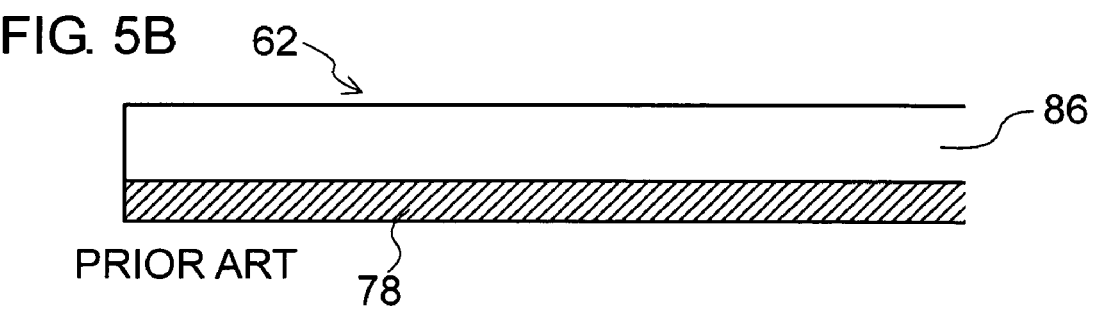
FIG. 5B is a sectional view illustrating the conventional liquid crystal display device.
Figure 8:
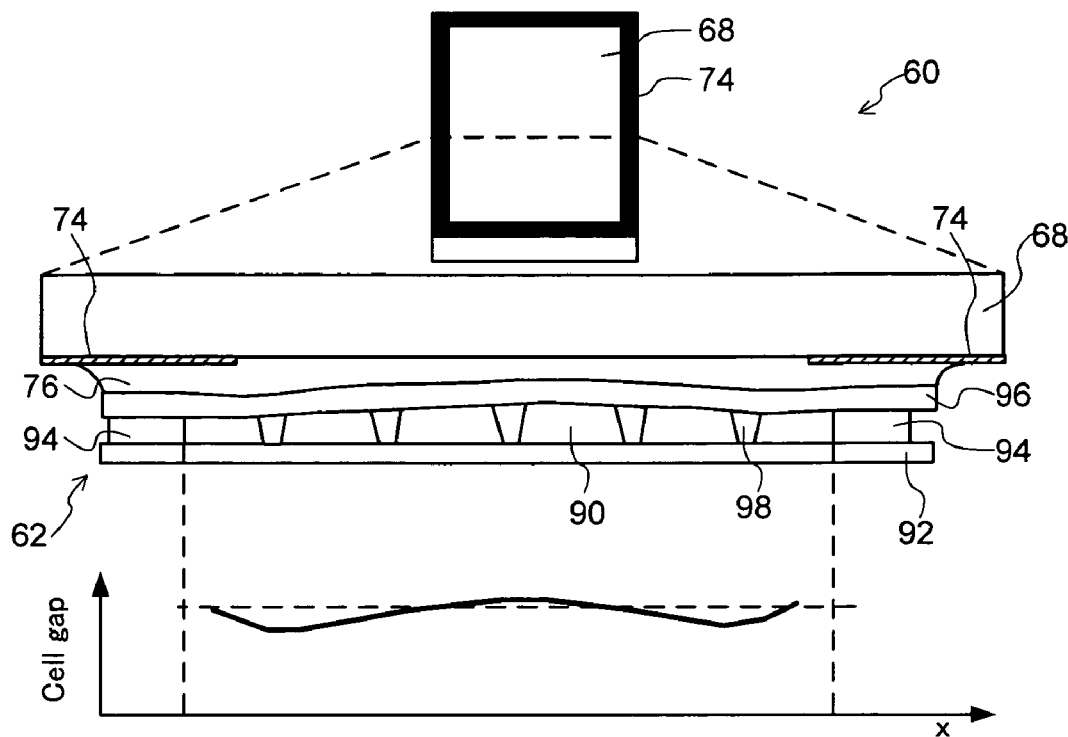
FIG. 8 is an explanatory view including a sectional view of the conventional liquid crystal display device and illustrating a substrate gap.

FIG. 5A is a longitudinal sectional view illustrating an end portion of the LCD 12 of the liquid crystal display device 10 according to the first embodiment of the present invention, and FIG. 5B is a longitudinal sectional view illustrating an end portion of an LCD 62 of the conventional liquid crystal display device. Conventionally, the LCD 62 has a structure in which only a black matrix 78 serving as a second light shielding portion is provided. In this embodiment, the LCD 12 has a structure in which the second reflecting portion 54 is provided on a translucent plate 32 side of the black matrix 50. In FIG. 5A, the second reflecting portion 54 is formed between the black matrix 50 and the color filter side glass 56. For that reason, as illustrated in FIG. 3, the light A2 emitted from the lateral side of the LCD 12 is propagated while being repeatedly reflected not on the black matrix 50 but between the second reflecting portion 54 and the reflecting portion 36. Accordingly, the attenuation of the light A2 can be suppressed and the optical adhesive 26 is sufficiently cured in the vicinity of the light shielding portion 34.

As described above, the reflecting portion having a high reflectance of light is provided on the display surface side of the light shielding portion. Further, the second reflecting portion having a high reflectance of light is provided on the display surface side of the second light shielding portion which is provided on the periphery of the LCD. Hence, in a case where the translucent substrate is bonded through the optical adhesive, propagation efficiency of the light emitted from the lateral side of the LCD can be enhanced by reflection of the reflecting portion and the second reflecting portion. Accordingly, a crosslinking reaction in the vicinity of the light shielding portion provided on the periphery of the LCD is promoted and the translucent substrate can be bonded stably. As a result, a mechanical bonding strength is enhanced and deterioration of an image, which is derived from curing variations of the optical adhesive, can be prevented.

Further, the second reflecting portion is provided outside the user's viewing range from the display surface side. Accordingly, the second reflecting portion cannot be viewed by the user, which prevents loss of visibility.

Note that, in the embodiment described above, the LCD having the TFT structure is adapted, but the present invention is not limited thereto. For example, the present invention may be applicable to another display panel such as an LCD having a structure other than the TFT structure, or an organic EL panel.

What is claimed is:

1. A display device, comprising:
    a display panel having a first substrate for displaying an image that is observed from a front surface of the first substrate;
    a translucent substrate covering the display panel from the front surface of the first substrate, the translucent substrate having a rear surface and a first light shielding portion on a periphery of the rear surface;
    a photo-curable translucent adhesive for integrally bonding a front surface of the first substrate and the rear surface of the translucent substrate to each other;
    a first light reflecting portion formed on the first light shielding portion of the translucent substrate; and
    a second light reflecting portion formed on a surface of the first substrate so as to oppose the first light reflecting portion through the photo-curable translucent adhesive.

2. A display device according to claim 1; further comprising:
    a second light shielding portion disposed on a periphery of the display panel;
    a second substrate forming the display panel with the first substrate, the second light reflecting portion being formed on a rear surface of the first substrate;
    a liquid crystal layer sandwiched between the first substrate and the second substrate; and
    a polarizing plate attached on the front surface of the first substrate.

3. A display device according to claim 2; wherein the first substrate comprises a color filter substrate, a black matrix being formed on the rear surface of the color filter substrate; and wherein the second light reflecting portion is formed between the black matrix and the color filter substrate.

4. A display device according to claim 1; wherein the first substrate has color filters and a black matrix on a rear surface of the first substrate, a second light shielding portion being formed between the black matrix and the first substrate.

5. A display device according to claim 1; wherein the second light reflecting portion is smaller than the first light shielding portion so that the second light reflecting portion is not observed from a front surface of the translucent substrate.

6. A display device comprising:
    a display panel having a substrate;
    a translucent substrate covering the display panel and having a light shielding portion on a periphery of a rear surface of the translucent substrate;
    a photo-curable translucent adhesive integrally bonding the translucent substrate and the substrate of the display panel to one another;
    a first light reflecting portion formed on the light shielding portion of the translucent substrate; and
    a second light reflecting portion formed on the substrate of the display panel so as to oppose the first light reflecting portion through the photo-curable translucent adhesive.

7. A display device according to claim 6; further comprising: wherein the substrate of the display panel comprises a first substrate and the display panel has a second substrate; and further comprising a liquid crystal layer sandwiched between the first substrate and the second substrate and a polarizing plate attached to the first substrate.

8. A display device according to claim 6; wherein the display panel substrate comprises a color filter substrate; and further comprising a black matrix formed on the color filter substrate, the second light reflecting portion being formed between the black matrix and the color filter substrate.

9. A display device according to claim 6; wherein the display panel substrate has color filters;
    and further comprising a black matrix formed on a surface of the display panel substrate, a second light shielding portion being formed between the black matrix and the display panel substrate.

10. A display device according to claim 6; wherein the second light reflecting portion is smaller than the light shielding portion so that the second light reflecting portion is not observed from a front surface of the translucent substrate.

* * * * *